US008225023B2

(12) United States Patent
Zhu

(10) Patent No.: US 8,225,023 B2
(45) Date of Patent: Jul. 17, 2012

(54) INDICATOR CONTROL APPARATUS

(75) Inventor: Hong-Ru Zhu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 39 days.

(21) Appl. No.: 12/854,900

(22) Filed: Aug. 12, 2010

(65) Prior Publication Data

US 2012/0023279 A1 Jan. 26, 2012

(30) Foreign Application Priority Data

Jul. 21, 2010 (CN) .......................... 2010 1 0232932

(51) Int. Cl.
*G06F 13/14* (2006.01)

(52) U.S. Cl. ....................................... 710/305; 340/10.3

(58) Field of Classification Search .................. 710/305, 710/3; 340/10.3
See application file for complete search history.

(56) References Cited

U.S. PATENT DOCUMENTS 4,229,734 A * 10/1980 Schultz .......................... 340/512
4,550,276 A * 10/1985 Callahan et al. .............. 315/312

* cited by examiner

*Primary Examiner* — Clifford Knoll
(74) *Attorney, Agent, or Firm* — Altis Law Group, Inc.

(57) ABSTRACT

An indicator control apparatus includes a bus connector, a signal converting unit, an address configuring unit, and an indicating unit. The signal converting unit receives bus signals from the bus connector. The address configuring unit sets an address of the signal converting unit. The signal converting unit converts the bus signals to digital input/output (I/O) signals in response to the address of the signal converting unit matching with the bus signals. The indicating unit is driven by the I/O signals and correspondingly displays information.

8 Claims, 1 Drawing Sheet

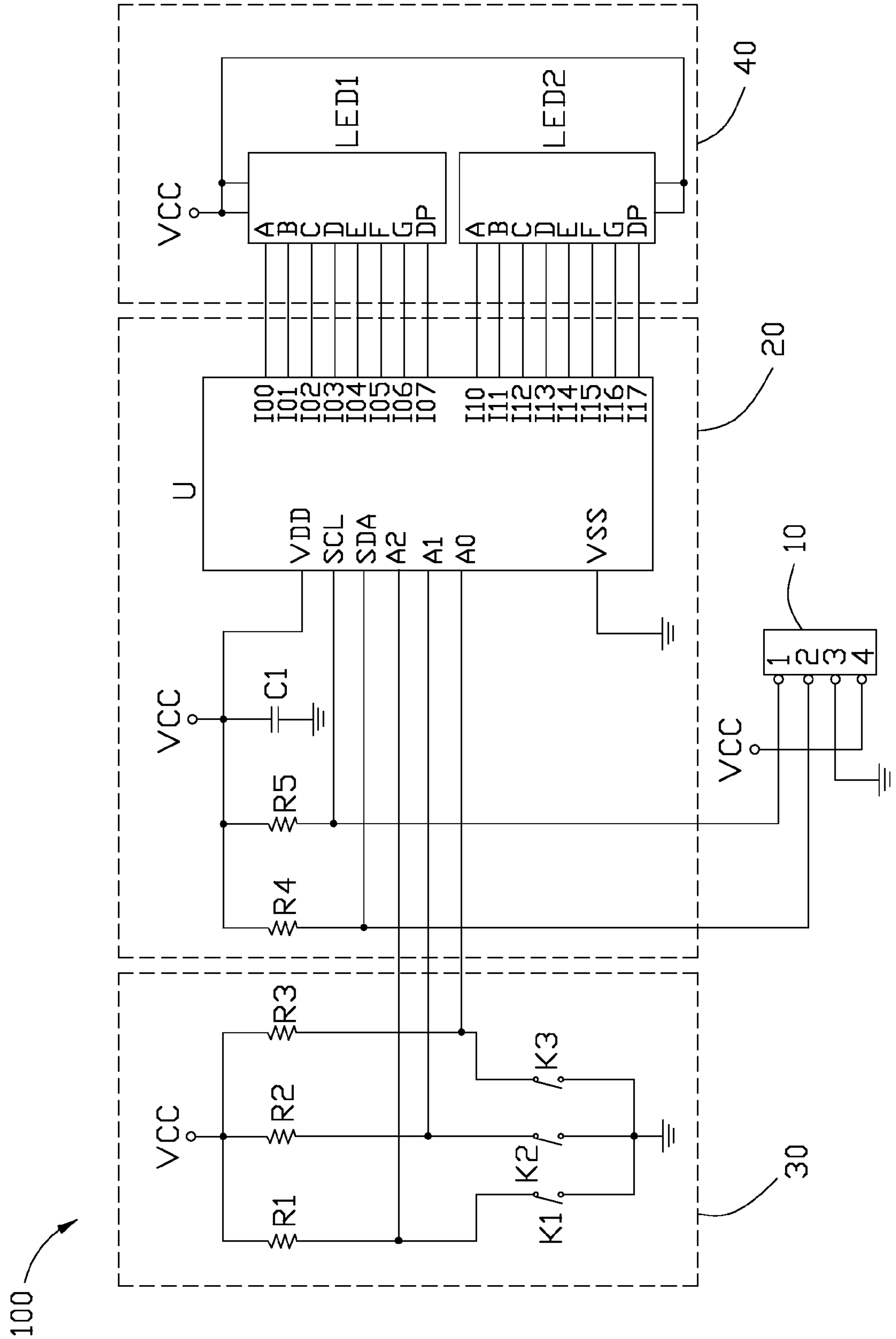
40
LED1
LED2
VCC
A B C D E F G DP
A B C D E F G DP
20
IO0 IO1 IO2 IO3 IO4 IO5 IO6 IO7
I10 I11 I12 I13 I14 I15 I16 I17
U
VDD SCL SDA A2 A1 A0
VSS
10
1 2 3 4
VCC
C1
VCC
R5
R4
R3
R2
R1
K3
K2
K1
VCC
30
100

INDICATOR CONTROL APPARATUS

BACKGROUND

1. Technical Field

The present disclosure relates to an indicator control apparatus.

2. Description of Related Art

In front panels of computers, there are some indicators, such as light-emitting diodes (LEDs), to indicate, for example, working states of the computers. For example, an LED is used to indicate different working states of a hard disk drive (HDD) in the computer. These LEDs are driven by indicator control apparatuses. Common indicator control apparatuses need some driving chips, such as a complex programmable logic device (CPLD), to drive the indicators. However, these driving chips are very expensive and occupy some hardware resources. Therefore, there is room for improvement in the art.

BRIEF DESCRIPTION OF THE DRAWING

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

The FIGURE is a circuit diagram of an embodiment of an indicator control apparatus.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references mean at least one.

Referring to the FIGURE, an embodiment of an indicator control apparatus 100 includes a bus connector 10, a signal converting unit 20, an address configuring unit 30, and an indicating unit 40.

The bus connector 10 is used to connect to a bus interface of a circuit board, such as an inter-integrated circuit (I2C) bus interface or a system management (SM) bus of a computer motherboard (not shown). The bus connector 10 includes a clock signal pin 1, a data signal pin 2, a ground pin 3, and a power pin 4. The clock signal pin 1 and the data signal pin 2 are connected to the signal converting unit 20. The ground pin 3 is grounded. The power pin 4 is connected to a power supply VCC.

The signal converting unit 20 includes a bus signal convertor U used to convert bus signals from the bus connector 10 to digital input/output (I/O) signals, thereby to drive the indicating unit 40. In one embodiment, the bus signal convertor U is a PCA9555PW bus signal convertor. The bus signal convertor U includes a power pin VDD, a clock signal pin SCL, a data signal pin SDA, a ground pin VSS, a first group of digital I/O signal output pins I00-I07, a second group of digital I/O signal output pins I10-I17, and three address pins A0, A1, and A2. The signal converting unit 20 further includes two resistors R4 and R5, and a capacitor C1. The power pin VDD is connected to the power supply VCC. The capacitor C1 is connected between the power pin VDD and ground. The resistor R4 is connected between the power supply VCC and the data signal pin SDA. The resistor R5 is connected between the power supply VCC and the clock signal pin SCL. The clock signal pin SCL and the data signal pin SDA are respectively connected to the clock signal pin 1 and the data signal pin 2 of the bus connector 10. The three address pins A0, A1, and A2 are connected to the address configuring unit 30. The bus signals includes an address part and a data part, if the address part matches with the voltage states of the address pins A0, A1, and A2, the data part of the bus signal is converted to digital I/O signals. If the address part does not match with the voltage states of the address pins A0, A1, and A2, the data part of the bus signal is not converted to digital I/O signals.

The address configuring unit 30 includes three resistors R1-R3, and three switches K1-K3. There are equal numbers of resistors and switches in the address configuring unit 30 and address pins of the bus signal convertor U. The resistor R1 and the switch K1 are connected in series between the power supply VCC and ground. The node between the resistor R1 and the switch K1 is connected to the address pin A2 of the bus signal convertor U. The resistor R2 and the switch K2 are connected in series between the power supply VCC and ground. The node between the resistor R2 and the switch K2 is connected to the address pin A1 of the bus signal convertor U. The resistor R3 and the switch K3 are connected in series between the power supply VCC and ground. The node between the resistor R3 and the switch K3 is connected to the address pin A0 of the bus signal convertor U. The address configuring unit 30 is used to set an address of the bus signal convertor U by adjusting the states of the switches K1-K3, for example, when the switches K1 and K2 are turned on and the switch K3 is turned off, the voltage states of the address pins A2, A1, and A0 of the bus signal convertor U are respectively set to low voltage level, low voltage level, and high voltage level, that means the address of the bus signal convertor U is set to "001", therefore, if the address part of the bus signals is also "001", the data part of the bus signals is converted to digital I/O signals to drive the indicating unit 40.

The indicating unit 40 includes two light-emitting diode (LED) indicators LED1 and LED2. Power pins of the indicators LED1 and LED2 are connected to the power supply VCC. Signal pins A-DP of the indicator LED1 are connected to the first group of digital I/O signal output pins I00-I07 of the bus signal convertor U. Signal pins A-DP of the indicator LED2 are connected to the second group of digital I/O signal output pins I10-I17 of the bus signal convertor U.

In use, the bus connector 10 is connected to a corresponding bus interface of the circuit board. If only one indicator control apparatus 100 is connected to the circuit board, the address of the bus signal convertor U of the indicator control apparatus 100 can be set to any address by the address configuring unit 30. The circuit board sends bus signals to the bus signal convertor U through the bus connector 10. The bus signal convertor U converts the bus signals to digital I/O signals to correspondingly drive the indicating unit 40 when the address of the bus signal convertor U matches with the bus signals. If more than two indicator control apparatuses 100 are connected to the circuit board, the addresses of the bus signal convertors U of the indicator control apparatuses 100 need to be set different addresses by the address configuring units 30. Therefore, the circuit board can control different indicator control apparatuses 100 by addressing the bus signals, thus allowing more information to be indicated by more than one indicator control apparatuses 100.

The indicator control apparatus 100 uses some inexpensive elements, which can reduce costs of manufacturing. Moreover, the circuit board can connect one or more indicator control apparatuses 100 to display more information, which is very convenient.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An indicator control apparatus comprising:

a bus connector;

a signal converting unit to receive bus signals from the bus connector;

an address configuring unit to set an address of the signal converting unit, wherein the signal converting unit converts the bus signals to digital input/output (I/O) signals in response to the address of the signal converting unit matching with the bus signals; and an indicating unit driven by the I/O signals and correspondingly displaying information.

2. The indicator control apparatus of claim 1, wherein the signal converting unit comprises a bus signal convertor comprising a clock signal pin, a data signal pin, and a plurality of digital I/O signal output pins, the clock signal pin and the data signal pin are connected to corresponding pins of the bus connector, the plurality of digital I/O signal output pins are connected to corresponding pins of the indicating unit.

3. The indicator control apparatus of claim 2, wherein the signal converting unit comprises a plurality of address pins connected to the address configuring unit, voltage states of the plurality of address pins are set by the address configuring unit.

4. The indicator control apparatus of claim 3, wherein the address configuring unit comprises a plurality of resistors having the same number as the plurality of address pins, and a plurality of switches having the same number as the plurality of address pins, each of the plurality of resistors with one of the plurality of switches are connected in series between a power supply and ground, nodes between the plurality of resistors and the plurality of switches are respectively connected to the plurality of address pins.

5. The indicator control apparatus of claim 1, wherein the indicating unit comprises at least one light-emitting diode (LED) indicator to receive the digital I/O signals and correspondingly display information.

6. The indicator control apparatus of claim 1, wherein the bus connector is selectively connected to a bus interface of a circuit board.

7. The indicator control apparatus of claim 1, wherein the bus connector comprising a clock signal pin, a data signal pin, a ground pin, and a power pin.

8. The indicator control apparatus of claim 1, wherein the signal converting unit comprises a plurality of address pins connected to the address configuring unit, voltage states of the plurality of address pins are set by the address configuring unit, the signal converting unit converts a data part of the bus signals to the digital I/O signals when a address part of the bus signals matches the voltage states of the plurality of address pins.

* * * * *